Dec. 26, 1950  R. T. HODGES, SR  2,535,576
LICENSE HOLDER FOR MOTOR VEHICLES
Filed Oct. 7, 1947
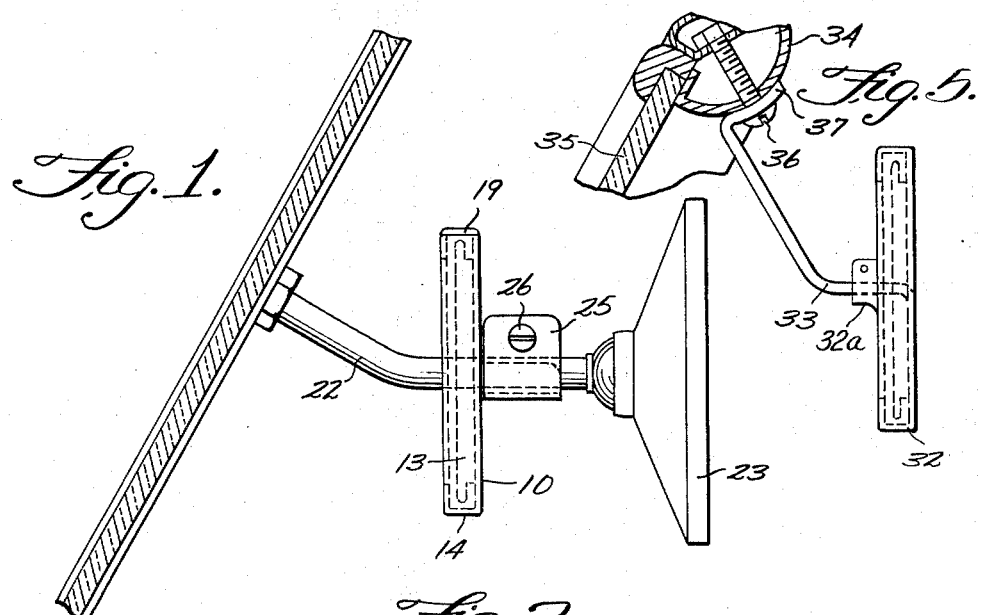
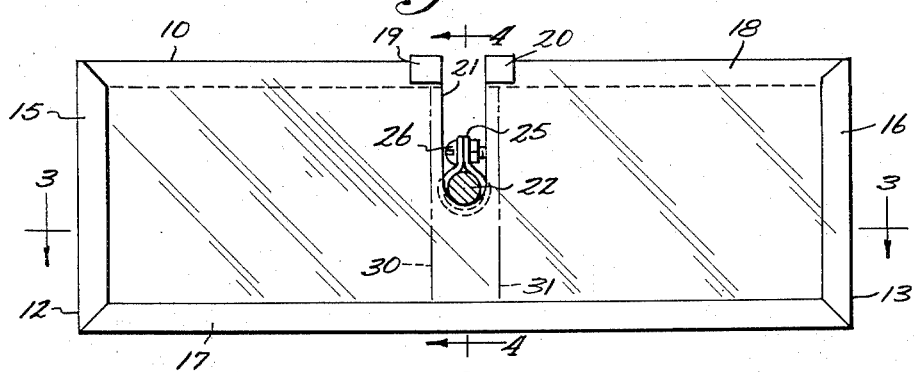
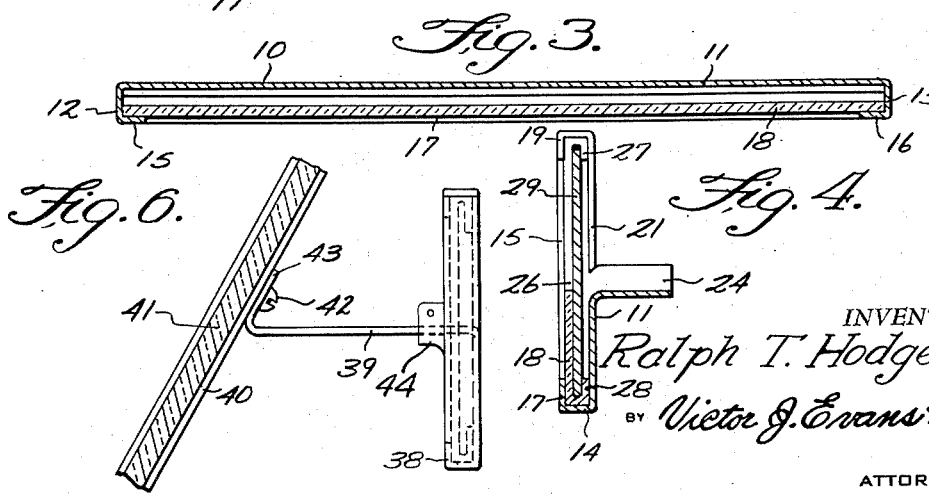
INVENTOR.
Ralph T. Hodges, Sr.
BY Victor J. Evans & Co.
ATTORNEYS Patented Dec. 26, 1950

2,535,576

UNITED STATES PATENT OFFICE 2,535,576

LICENSE HOLDER FOR MOTOR VEHICLES

Ralph T. Hodges, Sr., Bristol, Tenn.

Application October 7, 1947, Serial No. 778,343

2 Claims. (Cl. 40—16)

This invention relates to holders for motor vehicle license cards and the like and in particular a comparatively small rectangular-shaped frame adapted to be positioned behind the rear view mirror on the inner surface of a windshield and supported from the bracket of the mirror or from the windshield frame.

The purpose of this invention is to provide a holder for license cards of motor vehicles which holds the card in such a position that it may be read from the outside of the windshield without obstructing vision, and which provides means for maintaining the license whereby it is always on hand.

It is generally required that license cards of motor vehicles be kept in a visible position in a motor vehicle but as vehicles in general are not provided with suitable holders therefor the cards are generally found in glove compartments and the like. With this thought in mind this invention contemplates a holder for license cards that may be hidden by the rear view mirror and read from the outside of the windshield.

The object of this invention is to provide a license card holder in which the card may be held on the inside of a windshield of a motor vehicle and read from the outside.

Another object of the invention is to provide a license card holder for motor vehicles in which the card may be held behind the rear view mirror of the vehicle or in some other convenient position without obstructing vision through the windshield.

Another object of the invention is to provide a license card holder for motor vehicles in which the card may readily be removed and replaced.

A further object of the invention is to provide a motor vehicle license card holder which is of a simple and economical construction.

With these and other objects and advantages in view the invention consists of the new and useful combination, construction, and arrangement of parts as will be more fully described herein, set forth in the claims appended hereto, and disclosed in the accompanying drawings forming part hereof, wherein:

Figure 1 is a view illustrating the license card holder on the bracket of the rear view mirror.

Figure 2 is a view showing a front elevation of the holder with an arm of the mirror bracket shown in section.

Figure 3 is a longitudinal section through the holder taken on line 3—3 of Figure 2.

Figure 4 is a cross section through the holder taken on line 4—4 of Figure 2.

Figure 5 is a view showing a modification wherein the holder is suspended from an upper section of a windshield frame.

Figure 6 is a view showing a further modification in which the holder is suspended from the center section of a windshield.

Referring now to the drawings wherein like reference characters indicate corresponding parts the license card holder of this invention includes a frame 10 having a back 11 with ends 12 and 13, and a lower surface 14. The ends are provided with inwardly extending flanges 15 and 16 and the lower surface carries a flange 17 whereby an inner transparent holder 18 may be retained in the frame. The back is provided with clips 19 and 20 that extend over and hold the intermediate part of the inner holder 18. The back is also provided with a slot 21 that straddles an arm 22 of a rear view mirror 23 and at the lower end of the slot is a semi-circular flange 24, as shown in Figure 4, by which the holder frame may be held to the arm 22 by a U-shaped clamp 25 with a screw 26 therein.

The inner transparent holder 18 is also provided with a centrally disposed slot 26 registering with the slot 21 and the upper and lower edges are provided with flanges 27 and 28 that hold a license car 29 therein as shown in Figure 4. The license card, stamp, tags, or the like may be placed in the transparent envelope as indicated by the dotted lines 30 and 31 in Figure 2, and the envelope placed in the frame so that indicia thereon is visible from the front thereof.

In the design shown in Figure 5 the holder 32 is formed with an arm 33 which is held by a clamp 32a and the arm is secured to an upper section 34 of the frame of a windshield 35 by a bolt 36 through a flange 37 at the end of the arm.

In Figure 6 a holder 38 is suspended through a bar 39 from the center post or section 40 of a windshield 41 by a screw 42 in a flange 43 at the end of the bar. The bar 39 is attached to the holder by a clamp 44 and the end of the bar extends through the holder as shown in dotted lines.

These constructions are only typical and it will be understood that the holder may be supported from any suitable part of a windshield, or from the rear view mirror or any attachment in combination with the windshield, and the holder may be held by an arm, bar, or clamp of any suitable design.

With the license card, stamps or stickers mounted on a windshield in this manner they will always be in place and will not be washed off in cleaning the windshied. The location may be universal for all types of vehicles and they may be read from the outside and positioned where they will not obstruct vision through the windshield.

It will be understod that other modifications may be made in the design and arrangement of the parts without departing from the spirit of the invention.

What is claimed is:

1. A license card holder for motor vehicles having windshields with rear view mirrors mounted thereon by a bracket comprising a frame having a back with ends and a lower side and inwardly extending flanges on the said ends and lower side and in which the back is provided with a vertically disposed slot extending downward from the upper edge thereof, said back also having a flange extending rearwardly from the lower end of the slot and clips extending forwardly from the upper edge at the sides of the slot, a U-shaped clamp adapted to mount the frame through the rearwardly extending flange on the bracket of the rear view mirror, and a transparent card holding envelope with flanged sides and also having a vertically disposed slot registering with the slot in the back, said envelope adapted to be inserted in the frame and held therein by the flanges and clips thereof.

2. As an article of manufacture, a rectangular shaped frame with flanges at the ends and along the lower side and having overhanging clips extending from the upper edge, a transparent envelope with flanges on the upper and lower edges adapted to be inserted in the flanges of the frame, said frame and envelope having centrally disposed registering slots extending downward from the upper edges thereof and said frame having a rearwardly extending semi-circular flange at the lower end of the slot, a supporting arm positioned in said semi-circular flange and extended through the slots of the frame and envelope for securing the envelope in the frame, and a clamp on said semi-circular flange for mounting said frame through said flange.

RALPH T. HODGES, Sr.

REFERENCES CITED

The following references are of record in the file of this patent:

UNITED STATES PATENTS

| Number | Name | Date |
| --- | --- | --- |
| 1,109,962 | Chadwick | Sept. 8, 1914 |
| 1,197,065 | Sand | Sept. 5, 1916 |
| 1,494,234 | Gossett | May 13, 1924 |
| 2,165,389 | Krook | July 11, 1939 |
| 2,173,942 | Hiatt et al. | Sept. 26, 1939 |
| 2,385,778 | Evalt | Oct. 2, 1945 |
| 2,450,008 | Lomholt | Sept. 28, 1948 |